US012609328B2

(12) United States Patent
  Kobayashi et al.

(10) Patent No.: US 12,609,328 B2
(45) Date of Patent: Apr. 21, 2026

(54) INTERCONNECTOR FOR SOLID-OXIDE ELECTROCHEMICAL CELL STACK AND SOLID-OXIDE ELECTROCHEMICAL CELL STACK

(71) Applicant: TOSHIBA ENERGY SYSTEMS & SOLUTIONS CORPORATION, Kanagawa (JP)

(72) Inventors: Shohei Kobayashi, Kawasaki (JP); Tsuneji Kameda, Ota (JP); Masahiro Asayama, Yokohama (JP); Masato Yoshino, Yokohama (JP); Norikazu Osada, Ota (JP); Riko Inuzuka, Kawasaki (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 644 days.

(21) Appl. No.: 17/950,611

(22) Filed: Sep. 22, 2022

(65) Prior Publication Data

US 2023/0120134 A1    Apr. 20, 2023

(30) Foreign Application Priority Data

Oct. 15, 2021    (JP) ................................. 2021-169833
  Sep. 5, 2022    (JP) ................................. 2022-140458

(51) Int. Cl.
  *H01M 8/0228*    (2016.01)
  *H01M 8/021*    (2016.01)
  (Continued)

(52) U.S. Cl.
  CPC ......... *H01M 8/0245* (2013.01); *H01M 8/021* (2013.01); *H01M 8/0228* (2013.01);
  (Continued)

(58) Field of Classification Search
  CPC ...... H01M 8/021; H01M 8/0228; H01M 8/12; H01M 2008/1293
  See application file for complete search history.

(56) References Cited

U.S. PATENT DOCUMENTS 11,374,231 B2    6/2022  Noh et al.
  2010/0098994 A1    4/2010  Schuisky et al.
  (Continued)

FOREIGN PATENT DOCUMENTS

CA    2792306 A1    9/2011
  JP    2009-544850    12/2009
  (Continued)

OTHER PUBLICATIONS

European Search Report issued in corresponding European Application No. 22197099.9 dated Jun. 7, 2024 (7 pages).
  (Continued)

*Primary Examiner* — Jeremiah R Smith
(74) *Attorney, Agent, or Firm* — Foley & Lardner LLP

(57)    ABSTRACT

An interconnector for a solid-oxide electrochemical cell stack of the embodiment includes: a metal base containing an iron-based alloy containing chromium; and a protective film provided on a surface of the metal base. The protective film includes a protective film body containing at least one selected from a spinel oxide and a perovskite oxide, and dispersed phases scattered in the protective film body and containing an oxide of at least one element selected from the group consisting of rare earth elements and zirconium.

10 Claims, 3 Drawing Sheets

(51) Int. Cl.

| | | |
|---|---|---|
| *H01M 8/0232* | (2016.01) | |
| *H01M 8/0245* | (2016.01) | |
| *H01M 8/12* | (2016.01) | |

(52) U.S. Cl.
CPC ........... *H01M 8/0232* (2013.01); *H01M 8/12* (2013.01); *H01M 2008/1293* (2013.01)

(56) References Cited

U.S. PATENT DOCUMENTS

| | | | |
|---|---|---|---|
| 2010/0119886 A1 | 5/2010 | Nielsen et al. | |
| 2011/0198216 A1* | 8/2011 | Larsen ................ H01M 8/1213 | |
| | | | 204/242 |
| 2013/0004881 A1* | 1/2013 | Shaigan ................... C25D 5/12 | |
| | | | 429/465 |
| 2013/0230792 A1 | 9/2013 | Wilson et al. | |
| 2014/0023957 A1 | 1/2014 | Brandner et al. | |
| 2015/0194682 A1 | 7/2015 | Ashary | |

| | | | |
|---|---|---|---|
| 2015/0270558 A1 | 9/2015 | Wood | |
| 2018/0366743 A1 | 12/2018 | Armstrong | |
| 2021/0194017 A1* | 6/2021 | Noh ................... H01M 8/0228 |

FOREIGN PATENT DOCUMENTS

| | | |
|---|---|---|
| JP | 2013-012473 | 1/2013 |
| JP | 2014-509440 | 4/2014 |
| JP | 2015-081216 A | 4/2015 |
| JP | 2019-169240 A | 10/2019 |
| JP | 2020-144985 A | 9/2020 |
| WO | WO-2010/061585 | 6/2010 |
| WO | WO-2019/078674 | 4/2019 |
| WO | WO-2019/231975 A1 | 12/2019 |

OTHER PUBLICATIONS

AU Office Action for AU Appl. Ser. No. 2022235553 dated Feb. 2, 2024 (6 pages).

* cited by examiner

INTERCONNECTOR FOR SOLID-OXIDE ELECTROCHEMICAL CELL STACK AND SOLID-OXIDE ELECTROCHEMICAL CELL STACK

CROSSREFERENCE TO RELATED APPLICATIONS

This application is based upon and claims the benefit of priority from Japanese Patent Application No. 2021-169833, filed on Oct. 15, 2021 and Japanese Patent Application No. 2022-140458, filed on Sep. 5, 2022; the entire contents of which are incorporated herein by reference.

FIELD

Embodiments disclosed herein relate generally to an interconnector for a solid-oxide electrochemical cell stack and the solid-oxide electrochemical cell stack.

BACKGROUND

Hydrogen is one of new energy sources for a decarbonized society. Fuel cells, which convert chemical energy into electrical energy by electrochemically reacting hydrogen and oxygen, are attracting attention as a hydrogen application field. Fuel cells have high energy utilization efficiency and are being developed as large-scale distributed power sources, household power sources, and mobile power sources. Among fuel cells, a solid-oxide fuel cell (SOFC), which uses an electrolyte made of solid oxide to obtain electrical energy through an electrochemical reaction, is attracting attention in terms of efficiency and other factors. In the production of hydrogen, a solid-oxide electrolysis cell (SOEC), which applies a high-temperature steam electrolysis method to electrolyze water in a high-temperature steam state, has been studied. An operating principle of the SOEC is a reverse reaction of the SOFC, and the SOEC uses the electrolyte made of solid oxide similarly to the SOFC. The SOEC electrolyzes carbon dioxide ($CO_2$) to produce carbon monoxide (CO) and synthesizes CO and hydrogen ($H_2$) to eventually produce fuels such as methane ($CH_4$), so the SOEC is attracting attention as a technology for realizing the decarbonized society.

A solid-oxide electrochemical cell used in the SOFC, SOEC, or other cells has a stack of an air electrode (oxygen electrode), a solid-oxide electrolyte layer, and a hydrogen electrode (fuel electrode). By stacking multiple electrochemical cells each having such a stack with an interconnector therebetween, the electrochemical cell stack is used as a large-capacity electrochemical cell stack. The interconnector for the solid-oxide electrochemical cell is required to have high-temperature resistance, so a stainless alloy with high chromium content is generally used as a base of the interconnector. However, an oxide coating film composed mainly of $Cr_2O_3$ is formed on a surface of the stainless alloy with high chromium content at high temperatures. Since $Cr_2O_3$ has high electrical resistance, the oxide coating film on the surface becomes a factor that decreases electrical conduction of the interconnector and increases resistance of the solid-oxide electrochemical cell stack. Furthermore, when a Cr component in the $Cr_2O_3$ coating film gasifies and adheres to an electrode portion of the solid-oxide electrochemical cell, performance of the solid-oxide electrochemical cell is degraded. To suppress these problems, materials applied for the interconnector for the solid-oxide electrochemical cell stack have been widely investigated.

Generally, the interconnector for the solid-oxide electrochemical cell stack is covered with a dense protective film to suppress Cr evaporation. Functions required of the protective film include Cr evaporation suppression, electrical conduction, adhesiveness, and workability. The Cr evaporation suppression is a function to suppress the evaporation of Cr contained in the interconnector for the solid-oxide electrochemical cell stack, as Cr vaporizes under high-temperature operating conditions and degrades the performance of the solid-oxide electrochemical cell. The electrical conduction is a function to reduce energy loss by reducing electrical resistance when energized since electricity is necessary for reactions in the solid-oxide electrochemical cell. The adhesiveness is a function to prevent the protective film from peeling off due to repetition of temperature rise and fall between high temperature and room temperature because operating temperature of the solid-oxide electrochemical cell is a high temperature of 600° C. or higher. The workability is a function to ensure that the protective film is formed evenly since the interconnector for the solid-oxide electrochemical cell stack often has a complex shape.

For example, a spinel oxide that exhibits electrical conduction is used as the protective film for the interconnector. For example, it is proposed to form a ceramic protective film that contains a spinel-structure oxide containing Mn, Co, Cu, Y, and O on a surface of a conductive substrate. This ceramic protective film has a form in which Cu and Y are doped into the spinel structure composed of Mn, Co, and O. However, since such a ceramic protective film has many pores, a contact area between the protective film and the conductive substrate, which form the interconnector for the solid-oxide electrochemical cell stack, becomes small, the adhesiveness of the protective film is low, and the electrical resistance increases according thereto. It has also been proposed to insert a layer containing rare earth elements between chromium steel and the protective film. However, since vacuum evaporation or other methods is used to form the layer containing rare earth elements, it is difficult to form the layer with a uniform film thickness in complex shapes, resulting in low workability.

DETAILED DESCRIPTION

An interconnector for a solid-oxide electrochemical cell stack of an embodiment includes a metal base that contains an iron-based alloy containing chromium, and a protective film provided on a surface of the metal base, wherein the protective film includes a protective film body containing at least one selected from a spinel oxide and a perovskite oxide, and dispersed phases scattered in the protective film body and containing an oxide of at least one element selected from the group consisting of rare earth elements and zirconium.

Hereinafter, an interconnector for a solid-oxide electrochemical cell stack and the solid-oxide electrochemical cell stack of the embodiment will be described with reference to the drawings. In each embodiment presented below, the same codes are given to substantially the same components to partially omit their explanations in some cases. The drawings are schematically illustrated, in which the relationship between a thickness and plane dimensions, a ratio between thicknesses of parts, and the like may differ from actual ones.

Figure 1:
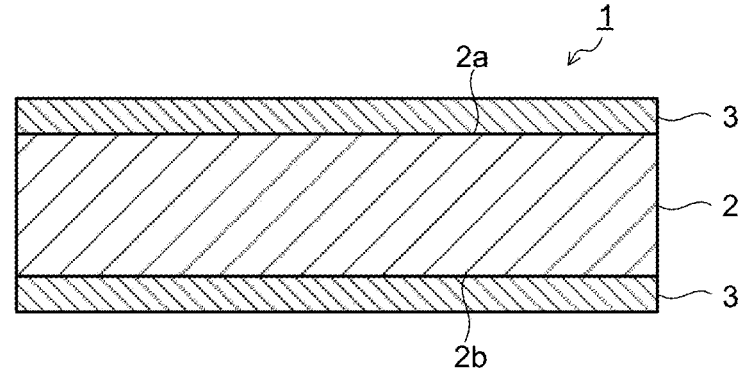
FIG. 1 is a cross-sectional view illustrating an interconnector for a solid-oxide electrochemical cell stack of an embodiment.

FIG. 1 illustrates a cross-section of an interconnector for a solid-oxide electrochemical cell stack according to a first embodiment. An interconnector 1 illustrated in FIG. 1 includes a metal base 2 having a first surface 2a and a second surface 2b. In using the interconnector 1 in a solid-oxide electrochemical cell stack, the first surface 2a of the metal base 2 is a surface that is disposed on a hydrogen electrode (fuel electrode) side and is exposed to a hydrogen-containing atmosphere. The second surface 2b of the metal base 2 is a surface that is disposed on an air electrode (oxygen electrode) side and is exposed to air. Hydrogen is not limited to flow on the first surface 2a side, and for example, methanol ($CH_3OH$) or other substances may flow in the SOFC.

Therefore, the first surface 2a needs to be a surface that is exposed to an atmosphere containing a substance having hydrogen atoms. Air is not limited to flow on the second surface 2b side. Nothing may flow or oxygen may flow in the SOEC, for example, so the second surface 2b needs to be a surface that is exposed to an atmosphere containing oxygen. A protective film 3 is provided on each of the first and second surfaces 2a and 2b of the metal base 2. FIG. 1 illustrates the interconnector 1 provided with the protective film 3 on each of the first surface 2a and the second surface 2b of the metal base 2, but the protective film 3 may be provided on only one surface of either the first surface 2a or the second surface 2b. The protective film 3 is preferably provided at least on the second surface (the surface disposed on the air electrode (oxygen electrode) side/exposed to the atmosphere containing oxygen) 2b.

Figure 2:
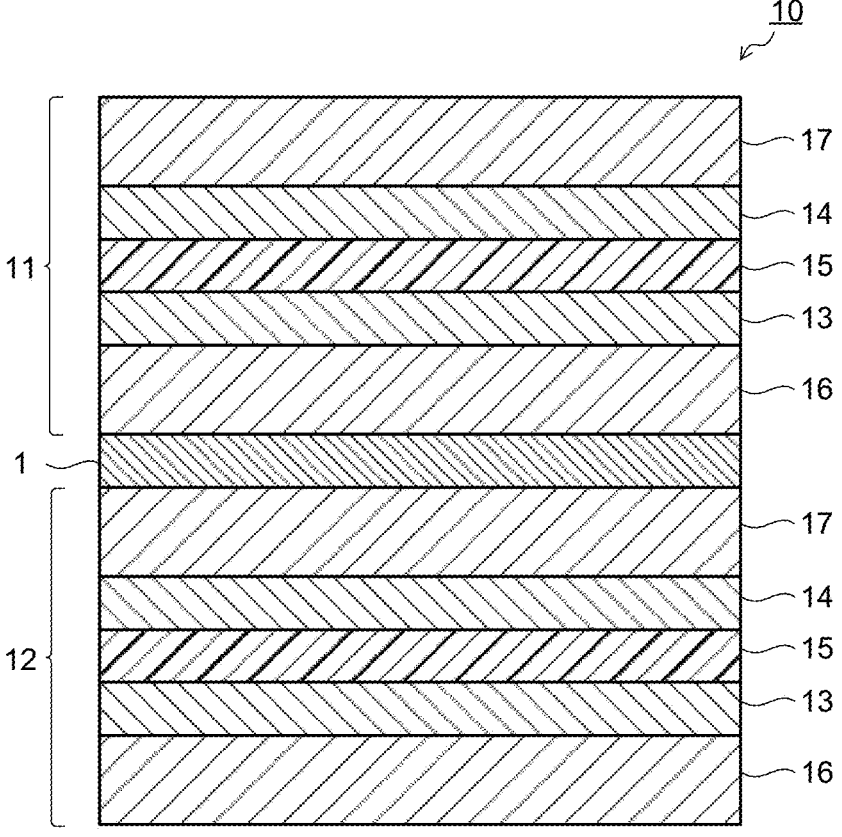
FIG. 2 is a cross-sectional view illustrating a solid-oxide electrochemical cell stack of the embodiment.

The interconnector 1 illustrated in FIG. 1 is used, for example, in a solid-oxide electrochemical cell stack 10 illustrated in FIG. 2. The solid-oxide electrochemical cell stack 10 illustrated in FIG. 2 has a structure in which a first electrochemical cell 11 and a second electrochemical cell 12 are stacked with the interconnector 1 therebetween. Although FIG. 2 illustrates the structure in which the first electrochemical cell 11 and the second electrochemical cell 12 are stacked, the number of stacking of the electrochemical cells 12 is not limited, and three or more electrochemical cells may be stacked. In the case of stacking three or more electrochemical cells, the interconnector is disposed between each of two adjacent electrochemical cells, and the electrochemical cells are electrically connected by the interconnector.

The first electrochemical cell 11 and the second electrochemical cell 12 have the same configuration, each having a first electrode 13 functioning as the hydrogen electrode (fuel electrode), a second electrode 14 functioning as the oxygen electrode (air electrode), and a solid-oxide electrolyte layer 15 disposed between these electrodes 13, 14. The first and second electrodes 13, 14 are each formed by a porous electric conductor. The solid-oxide electrolyte layer 15 is made of a dense solid-oxide electrolyte and is an ion conductor that does not conduct electricity. A porous first current-collecting member 16 may be disposed between the first electrode 13 and the interconnector 1 according to need. Similarly, a porous second current-collecting member 17 may be disposed between the second electrode 14 and the interconnector 1 according to need. The first and second current-collecting members 16 and 17 allow reaction gas to pass through and improve electrical connection between the first and second electrochemical cells 11, 12 and the interconnector 1, respectively.

Although omitted in FIG. 2, gas flow paths are provided around the first and second electrochemical cells 11, 12. In other words, the first and second electrodes 13, 14 are each supplied with supply gas according to intended use of the electrochemical cell stack 10 through a part of the gas flow path. Emission gas generated and discharged at each of the first and second electrodes 13, 14 is discharged from each of the first and second electrochemical cells 11, 12 through the other part of the gas flow path. The gas supplied to each of the first and second electrodes 13, 14 and atmospheres around the electrodes 13, 14 are separated by the dense solid-oxide electrolyte layer 15 and the interconnector 1. When the electrochemical cell stack 10 is used as a fuel cell such as the SOFC, reducing gas such as hydrogen ($H_2$) or methanol ($CH_3OH$) gas is supplied to the first electrode 13 as the hydrogen electrode (fuel electrode), while oxidizing gas such as air or oxygen ($O_2$) is supplied to the second electrode 14 as the oxygen electrode (air electrode). When the electrochemical cell stack 10 is used as an electrolysis cell such as the SOEC that applies a high-temperature steam electrolysis method, water vapor ($H_2O$) is supplied to the first electrode 13 as the hydrogen electrode.

The interconnector 1 illustrated in FIG. 1 is used as the interconnector 1, which is disposed between the first and second electrochemical cells 11, 12 in the electrochemical cell stack 10 illustrated in FIG. 2. In the interconnector 1, the first surface 2a of the metal base 2 is disposed on the first electrode 13 side as the hydrogen electrode, and the second surface 2b of the metal base 2 is disposed on the second electrode 14 side as the air electrode. Therefore, the first surface 2a of the metal base 2 is exposed to hydrogen supplied to the first electrode 13 as the hydrogen electrode, an atmosphere containing hydrogen, for example, mixed gas of hydrogen and water vapor, or a similar atmosphere containing hydrogen discharged from the first electrode 13. The second surface 2b of the metal base 2 is exposed to an atmosphere containing oxygen such as air supplied to the second electrode 14 as the air electrode.

In the interconnector 1 used in the electrochemical cell stack 10 illustrated in FIG. 2, an iron-based alloy containing chromium (Cr), that is, stainless steel (SUS) is used for the metal base 2. In the electrochemical cell stack 10, the metal base 2 made of ferritic stainless steel, which has a thermal expansion coefficient close to that of the electrochemical cells 11, 12, such as SUS430, for example, is applied. When stainless steel is used for the metal base 2, Cr contained in the metal base 2 may react with oxygen and water vapor and vaporize in a high-temperature range of approximately 600 to 1000° C., which is an operating temperature range of the SOFC and SOEC, adhering to the second electrode 14 and degrading its performance. Therefore, the interconnector 1 has the protective film 3 that covers at least the surface 2b of the metal base 2 to suppress the vaporization of chromium and accompanying evaporation.

Figure 3:
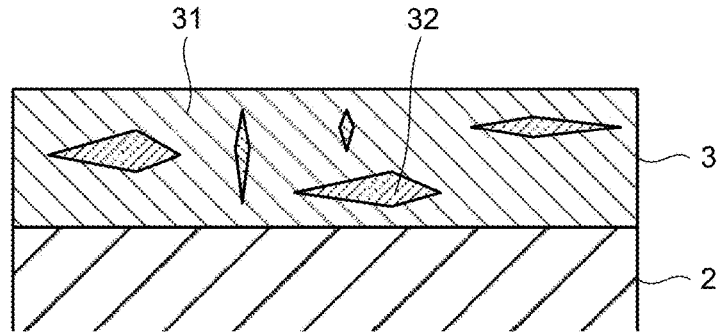
FIG. 3 is a cross-sectional schematic view of a protective film of the interconnector for the solid-oxide electrochemical cell stack of the embodiment.

As illustrated in a cross-sectional schematic view in FIG. 3, the protective film 3 has a protective film body 31 and dispersed phases 32 scattered in the protective film body 31. The protective film body 31 forms the entire protective film 3, and its composing material includes at least one selected from a spinel oxide and a perovskite oxide that exhibit electrical conduction in the operating temperature range of the SOFC, SOEC, and other cells. The spinel oxide is an oxide represented by $AB_2O_4$ (A and B are cationic elements of the same or different metallic elements, or the like). The perovskite oxide is an oxide represented by $ABO_3$ (A and B are cationic elements of the same or different metallic elements, or the like). Both the spinel oxide and the perovskite oxide exhibit the electrical conduction in the operating temperature range of the SOFC, SOEC, and other cells, and are suitable for the protective film body 31, which requires electrical conductivity.

The metallic elements contained in the spinel oxide and/or the perovskite oxide include at least one selected from the group consisting of cobalt (Co), nickel (Ni), manganese (Mn), copper (Cu), iron (Fe), chromium (Cr), zinc (Zn), aluminum (Al), titanium (Ti), lanthanum (La), and strontium (Sr). The spinel oxide containing Co is effective as the composing material of the protective film body 31. Since Co can function as both an A-site element and a B-site element in the spinel oxide, Co can form the spinel oxide represented by $Co_3O_4$. In addition, the material in which at least one selected from Ni, Mn, Cu, Fe, Cr, Zn, Al, and Ti is added to the Co-containing spinel oxide is also effective and can be expected to improve electrical conduction, alleviate discrepancies in the thermal expansion coefficients, and other effects. Furthermore, the spinel oxide using Fe, Ni, Mn, or other elements instead of Co can be used as the composing material of the protective film body 31.

The perovskite oxide includes an oxide containing Co and at least one selected from La and Sr, for example, such as $LaCoO_3$, $SrCoO_3$, $(La, Sr)CoO_3$. The material in which at least one selected from Ni, Mn, Cu, Fe, Cr, Zn, Al, and Ti is added to the perovskite oxide, for example, such as $La(Co, Fe)O_3$, $Sr(Co, Fe)O_3$, $(La, Sr)(Co, Fe)O_3$, may be used. The perovskite oxide with Mn, Ni, or other elements added instead of Fe may be used. Furthermore, the perovskite oxide containing Mn, Fe, Ni, or other elements instead of Co, for example, such as $SrMnO_3$, $SrFeO_3$, $SrNiO_3$, or the perovskite oxide to which the above-mentioned metallic elements are added, can be used as the composing material of the protective film body 31.

The Co-containing spinel oxide or other oxides described above has superior adhesiveness but inferior electrical conduction compared to the perovskite oxide. To address these points, the electrical conduction can be improved and the adhesiveness can be further enhanced by adding a small amount of rare earth elements and/or zirconium (Zr) to the Co-containing spinel oxide. The same is true when the perovskite oxide is used. Therefore, in the interconnector 1 of the embodiment, the dispersed phases 32 containing oxides of rare earth elements and/or Zr are scattered in the protective film body 31, which forms the protective film 3. Here, the scattered dispersed phases 32 refer to the state in which the dispersed phases 32 are irregularly present in a film thickness direction of the protective film 3 (vertical direction from a surface of the metal base 2).

The rare earth elements contained in the dispersed phase 32 include two elements of scandium (Sc) and yttrium (Y), and 15 elements from lanthanum (La) to lutetium (Lu), namely lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu), for a total of 17 elements. The dispersed phase 32 contains the oxides of these rare earth elements and/or the oxide of Zr.

According to the protective film 3 having the protective film body 31 scattered with the dispersed phases 32 containing the oxides of rare earth elements and/or the oxide of Zr as described above, the dispersed phases 32 containing the oxides of rare earth elements and/or the oxide of Zr contribute to the improvement of electrical conduction and the adhesiveness of the protective film body 31 containing the spinel oxide and/or the perovskite oxide. Furthermore, formation of pores at an interface between the metal base 2 and the protective film 3 and in the protective film 3 can be suppressed by scattering the dispersed phases 32 containing the oxides of rare earth elements and/or the oxide of Zr in the protective film body 31, compared to the case where rare earth elements and/or Zr are added as constituent elements of the protective film body 31. This can increase a contact area between the metal base 2 and the protective film 3, thereby improving the adhesiveness of the protective film 3. Furthermore, the electrical resistance of the protective film 3 can be reduced by improving the adhesiveness of the protective film 3.

Since the oxides of rare earth elements and/or the oxide of Zr have low electrical conduction, too many dispersed phases 32 scattered in the protective film body 31 may reduce the electrical conduction of the protective film 3. For this reason, the protective film 3 preferably contains the oxides of rare earth elements and/or the oxide of Zr, which constitute the dispersed phase 32, in a range of 3 mass % or more and 30 mass % or less in terms of metallic elements. When the content of the oxides of rare earth elements and/or the oxide of Zr in the protective film 3 is less than 3 mass % in terms of metallic elements, an amount of the dispersed phases 32 scattered in the protective film body 31 is too small, and the effects of improving the electrical conduction and adhesiveness of the protective film body 31 cannot be sufficiently obtained. When the content of the oxides of rare earth elements and/or the oxide of Zr in the protective film 3 exceeds 30 mass % in terms of metallic elements, the amount of the dispersed phases 32 may be too much, and the low electrical conduction of the dispersed phases 32 may affect the entire protective film 3, adversely reducing the electrical conduction of the protective film 3.

The protective film 3 preferably has a film thickness of 1 μm or more and 100 μm or less. The film thickness of the protective film 3 is more preferably 2 μm or more and 20 μm or less. When the film thickness of the protective film 3 is less than 1 μm, a protection effect of the metal base 2 by the protective film 3 may not be sufficient. When the film thickness of the protective film 3 exceeds 100 μm, the adhesiveness or other properties of the protective film 3 may decrease and the protective film 3 may easily peel off from the metal base 2. In particular, the adhesiveness of the protective film 3 to the metal base 2 can be enhanced to improve the peeling suppression effect while obtaining the protection effect of the metal base 2 by the protective film 3, by setting the film thickness of the protective film 3 to 20 μm or less. Furthermore, a porosity of the protective film 3 is preferably 30% or less. When the porosity of the protective film 3 exceeds 30%, the adhesiveness of the protective film 3 to the metal base 2 will decrease. However, since the porosity in the protective film 3 exhibits an effect of mitigating thermal expansion, the protective film 3 may have some pores of approximately 5% or more, for example.

A forming method of the protective film 3 is not limited, and for example, an electrolytic plating method, an electroless plating method, an electrodeposition method, a spin-coating method, a dip-coating method, a sol-gel method, and other methods can be applied. These forming methods of the protective film 3 are superior in workability compared to a vacuum deposition method, or other methods. According to a metal base with a protective film to which such forming methods can be applied, an interconnector excellent in adhesiveness and workability can be provided.

For example, when the electrolytic plating method is applied to form the protective film 3, the electrolytic plating is performed by immersing the metal base 2 in a plating bath containing the metallic element (for example, Co) as the constituent element of the protective film body 31 and the rare earth oxides and/or the Zr oxide as the composing materials of the dispersed phase 32. Next, heat treatment is performed in an oxidation atmosphere, such as in the atmosphere or oxygen atmosphere, for example, in a temperature range of 600° C. or higher. Since the metallic element as the constituent element of the protective film body 31 is easily oxidizable, oxides such as the spinel oxide and/or the perovskite oxide are formed by the oxidation treatment at high temperatures. The oxides formed can be controlled by a metallic element ratio, acid atmosphere, and other factors in the plating bath. Furthermore, since rare earth oxide particles and Zr oxide particles are contained in the plating bath, these oxide particles can be dispersed in a metal plating film. The plating film is then oxidized to form the protective film 3 including the protective film body 31 with the scattered dispersed phases 32 containing the oxides of rare earth elements and/or the oxide of Zr on the surface of the metal base 2. When other film-forming methods are used, similar conditions can be applied to obtain the interconnector 1 having the metal base 2 and the protective film 3 provided on the surface thereof as described above.

In the above embodiment, the solid-oxide electrochemical cell and the cell stack 10 formed by stacking the solid-oxide electrochemical cells are mainly described for application to the SOFC and/or SOEC, but the solid-oxide electrochemical cell and the cell stack 10 stacking the cells of the embodiment can also be applied to a CO2 electrolytic reaction device and other devices.

EXAMPLES

Next, concrete examples of the interconnector of the embodiment and evaluation results thereof are described.

Comparative Example 1

A substrate made of SUS430 was prepared as a metal base. The SUS substrate was immersed in a Co-plating bath for electroplating. The Co-plating bath does not contain rare earth oxides and/or a Zr oxide. Next, the SUS substrate with the Co-plating film was exposed to the atmosphere at 700° C. to oxidize the Co-plating film. The oxidized Co film was confirmed to be a Co oxide film composed mainly of a Co spinel oxide represented by $Co_3O_4$. A reflected electron image of a cross-section of the SUS substrate with the Co oxide film obtained in this way was observed. The electron reflection image according to Comparative Example 1 is presented in FIG. 4.

Example 1

A substrate made of SUS430 was prepared as a metal base. The SUS substrate was immersed in a Co-plating bath for electroplating. A plating bath containing $Y_2O_3$ particles dispersed in the Co-plating bath was used. The $Y_2O_3$ particles were added to the Co-plating bath so that an amount of Y element in a plating film was 8 to 16 mass %.

Next, the SUS substrate with a Co-plating film containing $Y_2O_3$ particles was exposed to the atmosphere at 700° C. to oxidize the Co-plating film. The oxidized Co film was confirmed to be a Co oxide film composed mainly of a Co spinel oxide represented by $Co_3O_4$ with scattered $Y_2O_3$ dispersed phases. A reflected electron image of a cross-section of the SUS substrate with the Co oxide film containing the $Y_2O_3$ dispersed phases obtained in this way was observed. The electron reflection image according to Example 1 is presented in FIG. 5.

Figure 4:
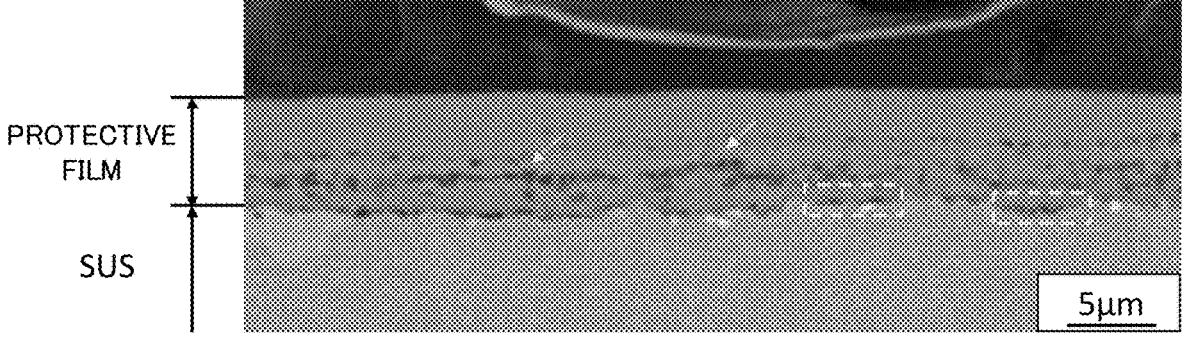
FIG. 4 is a reflected electron image of a cross-section of an interconnector for a solid-oxide electrochemical cell stack according to Comparative Example 1.

As presented in FIG. 4, continuous pores are observed in a protective film of Comparative Example 1 in a horizontal direction with a SUS substrate surface as indicated by arrows. Furthermore, pores are observed at an interface between the SUS substrate and the protective film, as indicated by dotted rectangles in FIG. 4. In the protective film of Comparative Example 1, many pores are observed in an interior and at the interface with the SUS substrate. It was confirmed that pores were present in approximately 20% of the protective film of Comparative Example 1. Such an area with many pores reduces the adhesiveness between the protective film and the SUS substrate, and there is a concern that the protective film may peel off. When such a metal substrate with the protective film is used as an interconnector for a solid-oxide electrochemical cell stack, the peeling of the protective film becomes a factor that reduces electrical conduction and causes structural destruction of the electrochemical cell stack.

Figure 5:
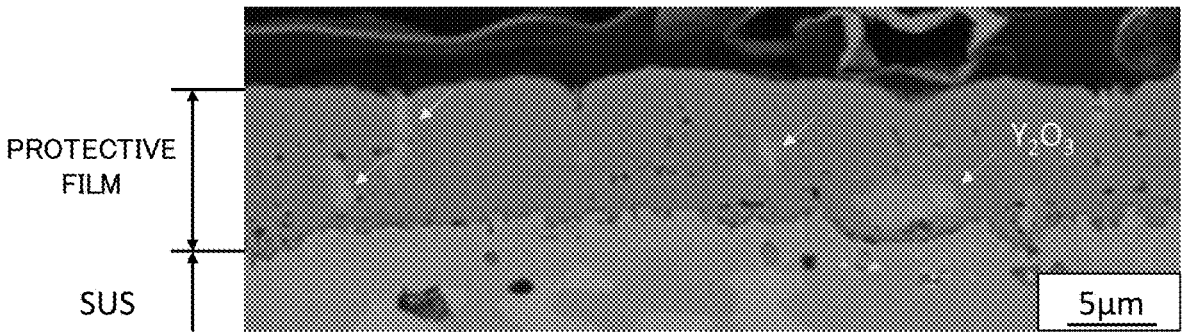
FIG. 5 is a reflected electron image of a cross-section of an interconnector for a solid-oxide electrochemical cell stack according to Example 1.

In contrast to the protective film of Comparative Example 1, as presented in FIG. 5, the protective film of Example 1 was observed to have the film composed mainly of the Co spinel oxide with the scattered dispersed phases composed mainly of $Y_2O_3$, as indicated by arrows in the image. It was observed that pores in the protective film and at the interface between the SUS substrate and the protective film were reduced. A porosity in the protective film of the example was approximately 6%. Thus, the pores in the protective film and at the interface between the protective film and the SUS substrate can be reduced by scattering the dispersed phases composed mainly of $Y_2O_3$ in the protective film, and adhesiveness between the protective film and the SUS substrate can be improved. Since the plating method is applied to form the protective film, workability can be improved. Therefore, according to Example 1, it is possible to provide a metal substrate with a protective film having excellent adhesiveness and workability, and an interconnector for a solid-oxide electrochemical cell stack using the metal substrate.

Example 2

A substrate made of SUS430 was prepared as a metal base. The SUS substrate was immersed in a Co-plating bath for electroplating. A plating bath containing $Y_2O_3$ particles dispersed in the Co-plating bath was used. The $Y_2O_3$ particles were added to the Co-plating bath so that an amount of Y element in a Co-plating film was 1 to 2 mass %. When the amount of Y element in the Co-plating film with a film thickness of 5 μm was measured by an X-ray fluorescence (XRF) analysis method, the amount was 1.83 mass %. Next, the SUS substrate with the Co-plating film containing the $Y_2O_3$ particles was exposed to the atmosphere at 700° C. for 10 hours to oxidize the Co-plating film. The oxidized Co film was confirmed to be a Co oxide film composed mainly of a Co spinel oxide represented by $Co_3O_4$ with scattered $Y_2O_3$ dispersed phases.

Figure 6:
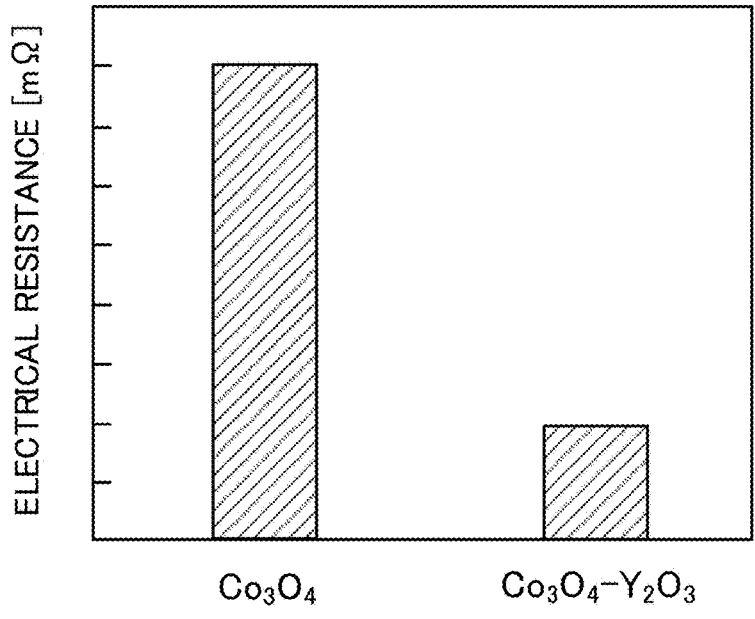
FIG. 6 is a view illustrating electrical resistance of an interconnector for a solid-oxide electrochemical cell stack according to Example 2 compared to that of the interconnector according to Comparative Example 1.

Electrical resistance of the SUS substrate with the Co oxide film containing the $Y_2O_3$ dispersed phases obtained in this manner was measured. The electrical resistance was measured by a four-probe method at 700° C. using a Pt electrode formed by Pt evaporation on the Co oxide film. Similarly, the electrical resistance of the SUS substrate with the Co oxide film not containing the $Y_2O_3$ dispersed phase formed in Comparative Example 1 was measured in the same way. The results of these measurements are presented in FIG. 6. As it was clear from FIG. 6, it was confirmed that the electrical resistance can be lowered by forming the Co oxide film containing the $Y_2O_3$ dispersed phases on the SUS substrate, compared to the case where the simple Co oxide film (not containing the $Y_2O_3$ dispersed phase) is formed on the SUS substrate. Thus, it is possible to provide an interconnector for a solid-oxide electrochemical cell stack having excellent properties.

Note that the above-explained configurations of the embodiments are applicable in combinations and part thereof may be replaced. While certain embodiments of the present invention have been explained, these embodiments have been presented by way of example only, and are not intended to limit the scope of the inventions. These embodiments may be embodied in a variety of other forms; furthermore, various omissions, substitutions, and changes may be made therein without departing from the spirit of the inventions. The accompanying claims and their equivalents are intended to cover such forms or modifications as would fall within the scope and spirit of the inventions.

What is claimed is:

1. An interconnector for a solid-oxide electrochemical cell stack, comprising:

a metal base including an iron-based alloy containing chromium; and a protective film provided on a surface of the metal base, wherein the protective film includes a protective film body containing at least one selected from the group consisting of a spinel oxide and a perovskite oxide, and dispersed phases scattered in the protective film body and containing yttrium oxide, wherein the protective film body contains at least one metallic element selected from the group consisting of Co, Ni, Mn, Cu, Fe, Cr, Zn, Al, Ti, La, and Sr, and the protective film contains 8 mass % or more and 16 mass % or less of the yttrium oxide in terms of yttrium.

2. The interconnector according to claim 1, wherein the protective film has a film thickness of 100 μm or less.

3. The interconnector according to claim 1, wherein a porosity in the protective film is 6% or less.

4. The interconnector according to claim 1, wherein the protective film body contains Co and at least one metallic element selected from the group consisting of Ni, Mn, Cu, Fe, Cr, Zn, Al, and Ti.

5. The interconnector according to claim 1, wherein the protective film body contains at least one selected from the spinel oxide containing Co and the perovskite oxide containing Co and at least one selected from the group consisting of La and Sr.

6. A solid-oxide electrochemical cell stack, comprising:

a first electrochemical cell including a first electrode in contact with an atmosphere containing a substance having hydrogen atoms, a second electrode in contact with an atmosphere containing oxygen, and a solid-oxide electrolyte layer interposed between the first electrode and the second electrode;

a second electrochemical cell including a first electrode in contact with an atmosphere containing a substance having hydrogen atoms, a second electrode in contact with an atmosphere containing oxygen, and a solid-oxide electrolyte layer interposed between the first electrode and the second electrode; and an interconnector disposed between the first electrode of the first electrochemical cell and the second electrode of the second electrochemical cell to be electrically connected with the first electrode and the second electrode, wherein the interconnector comprises a metal base containing an iron-based alloy containing chromium and a protective film provided on a surface of the metal base, and the protective film includes a protective film body containing at least one selected from the group consisting of a spinel oxide and a perovskite oxide, and dispersed phases scattered in the protective film body and containing yttrium oxide, wherein the protective film body contains at least one metallic element selected from the group consisting of Co, Ni, Mn, Cu, Fe, Cr, Zn, Al, Ti, La, and Sr, and the protective film contains 8 mass % or more and 16 mass % or less of the yttrium oxide in terms of yttrium.

7. The electrochemical cell stack according to claim 6, wherein the protective film has a film thickness of 100 μm or less.

8. The electrochemical cell stack according to claim 6, wherein a porosity in the protective film is 6% or less.

9. The electrochemical cell stack according to claim 6, wherein the protective film body contains Co and at least one metallic element selected from the group consisting of Ni, Mn, Cu, Fe, Cr, Zn, Al, and Ti.

10. The electrochemical cell stack according to claim 6, wherein the protective film body contains at least one selected from the spinel oxide containing Co and the perovskite oxide containing Co and at least one selected from the group consisting of La and Sr.

\* \* \* \* \*